A. J. HERSEY.
HORSESHOE CALK.
APPLICATION FILED MAY 26, 1914.
1,210,648.
Patented Jan. 2, 1917.
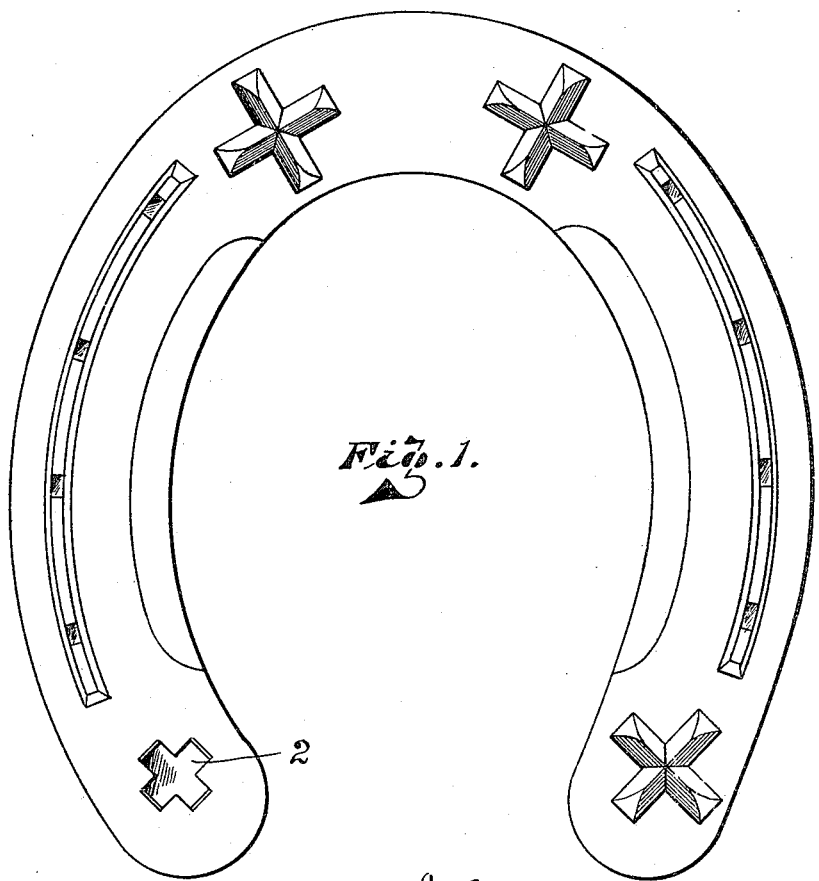
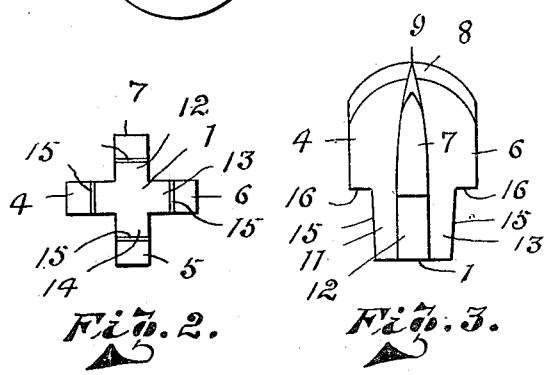
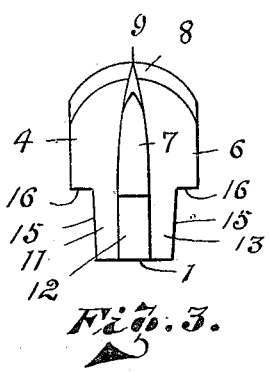
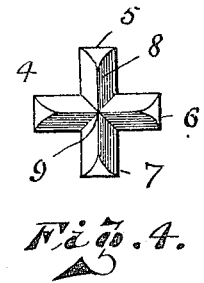
WITNESSES.
INVENTOR.
A. J. Hersey
BY
ATTORNEY

UNITED STATES PATENT OFFICE.

ARTHUR J. HERSEY, OF DULUTH, MINNESOTA, ASSIGNOR OF ONE-FOURTH TO RALPH F. McDOUGALL, OF DULUTH, MINNESOTA, AND ONE-FOURTH TO CLARENCE M. KEMP, OF ST. PAUL, MINNESOTA.

HORSESHOE-CALK.

1,210,648.   Specification of Letters Patent.   Patented Jan. 2, 1917.

Application filed May 26, 1914. Serial No. 841,173.

*To all whom it may concern:*

Be it known that I, ARTHUR J. HERSEY, a citizen of the United States, residing at Duluth, in the county of St. Louis and State of Minnesota, have invented certain new and useful Improvements in Horseshoe-Calks, of which the following is a specification, reference being had therein to the accompanying drawing.

My invention relates to improvements in horseshoe calks.

The object of my invention is to provide a horseshoe calk which will give the horse a firm grip upon the ground to prevent slipping and at the same time providing a calk which is self-sharpening and permanent until the calk is entirely worn down.

Another object of my invention is to provide a horseshoe calk which can be readily applied or removed and at the same time providing a horseshoe calk which is very economical in its manufacture and having certain details of structure hereinafter more fully set forth.

In the accompanying drawing—Figure 1 is a bottom plan view of a horseshoe equipped with my improved calks, one of which has been removed to show the shape of the hole required to receive the calk. Fig. 2 is a top plan view of the improved calk. Fig. 3 is a side elevation of Fig. 2. Fig. 4 is a bottom plan view of the calk.

Referring now to the drawings, 1 represents the shank of the calk, which is of the shape shown in Fig. 2 of the drawing and is adapted to enter a correspondingly shaped hole 2 in the shoe, the shank and hole both being tapered correspondingly to insure a close fit and yet prevent the calk from being driven down to the shoulder of the blades, as will be hereinafter more fully described.

The calk consists of four radially extending portions 4, 5, 6 and 7 having their upper edges sharpened, as indicated at 8, and said sharpened edges all starting from a central common point 9, as clearly shown in Figs. 1 and 4. These sharpened edges 8 are curved, as clearly shown in Fig. 3, which gives a greater holding surface for the calk. The shank 1 is formed of four radially extending portions 11, 12, 13 and 14, which have their outer walls slightly tapering as indicated at 15, and said radially extending portions are of a length considerably less than that of the main body of the calk, as clearly illustrated in Fig. 3 of the drawings.

The two opposite radially extending portions 4 and 6 of the calk proper are of a height less than that of the portions 5 and 7, as indicated at 16, Fig. 3. The general transverse form throughout the length of the calk and also that of the shank is that of a Greek cross, the four radial portions of which form the blades and the four radial portions of the shank forming the portion for entering the opening 2 in the shoe and securing the same therein.

The two radially extending portions 4 and 6, being slightly less in height than that of the radial portions 5 and 7, it will be seen that when the calk is driven home into the opening 2 in the shoe, the radial portions 5 and 7 will more nearly engage the lower face of the shoe, leaving the radial portions 4 and 6 a slightly greater distance away from the lower face of the shoe. This enables an instrument to be placed between the lower edges of the portions 4 and 6 and the lower face of the shoe to remove the calk when desired.

From the foregoing it will be seen that under ordinary conditions, a good substantial bearing surface is provided and since the bearing edge is designed to be of a rounded nature easy stepping action is provided for the horse. When the conditions are such that the horse has a tendency to slip, the sharp angles formed by the blades of the calk will resist and prevent any slipping motion.

Having thus described my invention, what I claim and desire to secure by Letters Patent is:

1. The combination with a horseshoe having an opening therein, of a calk having a tapered shank, said calk having a plurality of shoulders extending beyond the shank, some of said shoulders arranged at a greater distance from the end of the tapered shank than the others, the said tapered shank fitting within the opening so that the shoulders thereon nearest the end of the tapered shank lie against the shoe, whereby the other shoulders are spaced apart from the shoe for the purpose described.

2. The combination with a horseshoe having an opening therein, of a calk having a tapered shank, said calk having a plurality of radial portions extending beyond the shank forming shoulders, some of which are arranged at a greater distance from the end of the tapered shank than the others, the said tapered shank fitting within the opening so that the shoulders thereon nearest the end of the tapered shank lie against the shoe, whereby the other shoulders are spaced apart from the shoe for the purpose described.

3. A horseshoe calk having a shank portion composed of tapered radial portions to fit a corresponding opening in the horseshoe, the calk having a plurality of radially arranged arms of greater width than the arms of the shank to form shoulders, some of the shoulders being at a greater distance from the end of the shank than others and the shank so proportioned with respect to the opening in the horse shoe as to permit the shoulders nearer the end of the shank to abut against the shoe and space the remaining shoulders therefrom, for the purpose described.

In testimony whereof I hereunto affix my signature in the presence of two witnesses.

ARTHUR J. HERSEY.

Witnesses:
R. F. McDougall,
S. Geo. Stevens.

Copies of this patent may be obtained for five cents each, by addressing the "Commissioner of Patents, Washington, D. C."